United States Patent [19]
Erban et al.

[11] Patent Number: 5,312,170
[45] Date of Patent: May 17, 1994

[54] ANTI-LOCK BRAKE SYSTEM

[75] Inventors: Andreas Erban, Bietigheim-Bissingen; Harald Michi, Ölbronn-Dürrn; Matthias Volkert, Ludwigsburg; Chi-Thuan Cao, Korntal-Münchingen, all of Fed. Rep. of Germany

[73] Assignee: Robert Bosch GmbH, Stuttgart, Fed. Rep. of Germany

[21] Appl. No.: 867,112

[22] PCT Filed: Oct. 25, 1991

[86] PCT No.: PCT/DE91/00830
§ 371 Date: Jul. 2, 1992
§ 102(e) Date: Jul. 2, 1992

[87] PCT Pub. No.: WO92/07741
PCT Pub. Date: May 14, 1992

[30] Foreign Application Priority Data
Feb. 11, 1990 [DE] Fed. Rep. of Germany ....... 4034814

[51] Int. Cl.[5] .............................................. B60T 8/32
[52] U.S. Cl. .................................. 303/103; 303/104; 303/106; 303/110; 303/100

[58] Field of Search ............... 303/102, 103, 104, 100, 303/105, 106, 107, 108, 109, 110, 96–99; 180/197; 364/426.01, 426.02, 426.03; 188/181 A, 181 C

[56] References Cited

U.S. PATENT DOCUMENTS

4,794,538 12/1988 Cao et al. ........................... 303/95 X
4,916,619 4/1990 Walenty et al. ................. 303/106 X

FOREIGN PATENT DOCUMENTS

0032853 7/1981 European Pat. Off. .
0219023 4/1987 European Pat. Off. .
0392686 10/1990 European Pat. Off. .
2447182 4/1976 Fed. Rep. of Germany .
3535843 4/1987 Fed. Rep. of Germany .
3814457 11/1989 Fed. Rep. of Germany .
9006872 6/1990 PCT Int'l Appl. .

*Primary Examiner*—Douglas C. Butler
*Attorney, Agent, or Firm*—Spencer, Frank & Schneider

[57] ABSTRACT

The ABS described has phases of regulation to a setpoint slip value and phases of brake pressure control in the case of instabilities of the wheel. The setpoint slip is determined from a fixed maximum friction coefficient $\mu$max and the brake pressure introduced is determined from the slip value when $\mu$max occurs.

18 Claims, 3 Drawing Sheets

ANTI-LOCK BRAKE SYSTEM

PRIOR ART

So-called slip regulators are known in which the wheel slip is formed from the wheel speed and a reference variable which is derived from the wheel speed and is approximated to the characteristic of the vehicle speed. There, valves are actuated and the brake pressure varied when thresholds are exceeded and undershot by the wheel slip.

SUMMARY OF THE INVENTION

The present invention is an anti-lock brake system for a vehicle wheel of the type wherein the wheel speed VR and the brake pressure PB and determined and, with the aid of a reference speed VRef, slip actual values S are formed which are used to regulate the brake pressure PB at the wheel brake. According to the invention, the regulating phases and brake pressure control phases alternate, in that: during the regulating phases, the friction coefficient $\mu$ is determined continuously from the brake pressure PB and the wheel deceleration BR; during each regulator phase the maximum value of the friction coefficient $\mu$max is determined, as is, in addition, the slip value SK when the maximum friction coefficient is reached; the slip value SK is in each case used to form a somewhat smaller slip setpoint value Sdes. which is specified as the slip setpoint vale for a slip regulator in the following regulating phase; if the wheel slip S rises during the regulating phases above a predetermined value SB, the system is switched over to brake pressure control, during which a reduced brake pressure Pmin initially is introduced; after the slip S has fallen below the value SB during the brake pressure control phase, an increased brake pressure PS relative to Pmin is introduced; and the slip regulator is brought into effect with the new setpoint slip Sdes. when the slip S becomes smaller than SK.

In the invention, the wheel slip is used as the controlled variable. The slip setpoint value for regulation is here obtained from the vehicle speed, the brake pressure and the wheel speed. The invention guarantees good utilization of the available friction coefficient potential and automatic and rapid adaptation to changed friction coefficient potentials. The invention is of particular interest for lorries with an ELB system.

In the invention, the driver specifies the brake pressure via the service brake valve during the initial braking phase. In parallel therewith, the primary control enables the acquisition of the maximum friction coefficient and the slip at the maximum friction coefficient $\mu$.

As soon as a switching threshold is exceeded (instability present), the pressure control is activated. From the $\mu$max determined, the pressure control specifies the brake pressure. After stabilisation of the wheel, the regulator is activated and then regulates the pressure to the setpoint slip determined during the initial braking phase.

Due to changed roadway conditions or due to the effect of the adaptation, the wheel passes briefly into the unstable range, resulting in an end to the regulating phase Since the recording of $\mu$max and SK is restarted afresh during each regulating phase, current values for $\mu$max and SK are available again for the pressure control phase and for the subsequent new regulating phase. The primary control switches the brake pressure over to the driver-specified pressure and initialises the overall system as soon as the brake pressure required by the driver is smaller than the existing brake pressure or a low threshold (minimum value vmin) for the vehicle speed is undershot.

Further details relating to the acquisition of the individual variables and the regulation and control are provided below.

From the wheel speed (hub speed) VN measured at the wheel rim, the "hub slip" SN is obtained:

$$SN = 1 - (VN/VREF) \tag{1.1}$$

The dynamics of the slip build-up in the footprint is taken into account by a filter acting as an average former. The term "footprint" is taken to mean the tire contact area (tire-roadway contact area). A filter with a variable "time constant" is given as an illustrative embodiment. The filter time constants are determined with the aid of a brush model.

The differential equation for the filter is as follows:

$$S(k+1) = S(k) + TSL*[SN(k) - S(k)] \tag{1.2}$$

The time constant of the filter is adapted continuously to the transit time of a brush element through the footprint of the tire and is hence dependent on the vehicle speed. For the filter parameter TSL, the following relation applies:

$$TSL = h*(|VF|/LA) \tag{1.3}$$

where:
sampling time : h
vehicle speed : VF
footprint length : LA

Using the variables brake pressure PB and wheel deceleration BR, the friction coefficient $\mu$ in the stable range can be expressed approximately as:

$$\mu = \frac{\Theta_R}{FZ \cdot r^2} \cdot BR \cdot \frac{CP}{FZ \cdot r} \cdot PB \tag{1.4}$$

Wheel load : FZ
Moment of inertia of wheel : $\Theta_R$
Tire radius : r
Proportionality factor : CP In this form, the equation (1.4) provides values of $\mu$ with only limited accuracy since parameter fluctuations cannot be encompassed.

The dynamics of the instantaneously used friction coefficient, on the other hand, are simulated well since the parameter drift (principally due to temperature and aging) is slow in comparison to the dynamics of the friction coefficient used.

During the initial braking phase, the instantaneously used friction coefficient $\mu$ is determined in accordance with equation (1.4). The initial braking phase is ended as soon as the wheel deceleration exceeds a fixed threshold or the slip has become greater than a fixed threshold. The wheel has then passed through the stable range of the $\mu$-slip curve with a pronounced maximum.

The maximum friction coefficient $\mu$max achieved can be determined by the maximum pointer principle during the pressure build-up phase. In parallel therewith, the slip value filtered in accordance with equation (1.2), time-shifted by a fixed dead time TD, is taken as a measure of the slip SK when the maximum of $\mu$ is reached.

Whenever $\mu$max is updated, SK is simultaneously redetermined from the filtered value S (t-TD).

The slip value in the footprint and the "hub slip" differ dynamically since, in non-steady-state operation, the tire has a delaying action "wind-up" of the tire. The hub slip runs ahead of the actual slip in the footprint, with respect to time. This is compensated for approximately by associating $\mu$max with SK with the time shift by the dead time TD.

The value for TD is determined with the aid of a tire model or determined experimentally. The acquisition of $\mu$max and SK accompanies each initial braking phase and each regulating phase. At the beginning of each regulating phase, the acquisition is restarted and initialised. The values for SK and $\mu$max are limited to physically sensible values.

When the wheel enters a range of high slip, regulation is superseded by pressure control after a fixed slip threshold (F) unambiguously characterising the unstable range is exceeded. This occurs in the interest of minimising the loading of the actuator and avoids droops in the vehicle deceleration. If, before the accumulation of the high slip, the wheel was in a stable phase and the slip becomes greater than S, the reactivation pressure $P_S$ and the minimum pressure Pmin is calculated as a function of $\mu$max. The reactivation pressure PS is chosen so that the braking torque becomes equal to the maximum possible circumferential torque.

For the torque equilibrium of the wheel, the following must apply:

$$r \cdot \mu \cdot FZ = cp \cdot PB \qquad (1.5)$$

From this, the following is obtained for PB:

$$PB = \frac{r \cdot FZ}{cp} \cdot \mu = FP \cdot \mu \qquad (1.6)$$

Wheel radius : r
Wheel load : FZ
Proportionality factor
Brake pressure-braking torque : cp
For PS, the following is obtained:

$$PS = PF \cdot FP \cdot \mu max \qquad (1.7)$$

Maximum friction coefficient : $\mu$max
Safety factor (<1) : PF
Constant : FP

The value cp is an approximation for the hysteresis-affected relation between the brake pressure and braking torque, i.e. the factor cp indicates the mean slope of the hysteresis between brake pressure and braking torque. To simplify matters, the static wheel load was used for the wheel load FZ in forming the constant FP.

On surfaces with low friction coefficients, the wheel would under certain circumstances no longer return to the stable range if the pressure PS were retained continuously in the transitional phase. In such cases, therefore, the pressure is reduced again to the value PMIN. For the minimum pressure PMIN, the following empirical relation has proven favourable:

$$PMIN = PS \cdot (\mu max + \mu o) \qquad (1.8)$$

with the condition:
PMIN <= PS
Maximum friction coefficient : $\mu$max
Reactivation pressure : PS
Constant : $\mu$o Given an appropriate choice of $\mu$o, PMIN is approximately equal to PS on surfaces with a high friction coefficient. In the case of surfaces with a low friction coefficient, PMIN is markedly smaller than the reactivation pressure PS.

The minimum pressure PMIN is set when the following applies:

$$S > S\_B$$

The reactivation pressure PS is set while the pressure control is active if the following applies:

$$S > S\_B$$

In parallel with the pressure, the integrator of the regulator is set to the value of PS in order to guarantee a smooth transition from control to regulation.

Since the variable $\mu$max is limited in its absolute accuracy, an error monitoring device advantageously reduces the pressure if the wheel runs at slip values greater than S_B for longer than a certain time period. The wheel is thus brought back into the stable range even in the case of an error.

A new regulating phase begins when the following applies:

$$S < SK$$

The structure of the regulator itself depends crucially on the structure of the actuating device available. As an illustrative embodiment, a slip regulator is described which works with a secondary pressure regulation. The output variable of the slip regulator represents the pressure setpoint value for the secondary brake pressure regulation. The slip regulator is designed as a simple PID regulator with limitation of the integral component and limitation of the output signal. The slip SK multiplied by a safety factor is used as the setpoint value:

$$S\_SOLL = SKF \cdot SK \qquad (1.9)$$

(Safety Factor SKF<1).

The regulator parameters gain KP and reset time TI are switched over depending on the situation.

If the following applies: $S < S\_SOLL$ (pressure build-up), then $$KP = KP\_L \text{ and}$$

$$TI = TI\_L$$

If the following applies: $S > S\_SOLL$ (pressure reduction), then $$KP = KP\_S$$

$$TI = TI\_S$$

Here $KP\_L < KP\_S$ and $TI\_L > TI\_S$

The regulation parameters for the unstable range are chosen to be somewhat more stringent.

Changes in the friction coefficient are smoothed out by the regulator since it always tries to hold the wheel at the corresponding slip setpoint value. In the event of changes in the slip SK, the following cases can occur:

1. Transition from high SK to low SK
2. Transition from small SK to high SK.

In the first case, the wheel enters the unstable range, the regulator reduces pressure immediately and a new slip setpoint value is determined. In the second case, the slip regulating system does not notice that the wheel is being underbraked unless special measures are taken. For this case, the instantaneous slip setpoint value must be continuously checked. This is performed by continually increasing the slip setpoint value until the wheel tries to dip again.

BRIEF DESCRIPTION OF THE DRAWINGS

Illustrative embodiments of the invention are explained with reference to the drawings wherein.

DETAILED DESCRIPTION OF THE DRAWINGS

Figure 1:
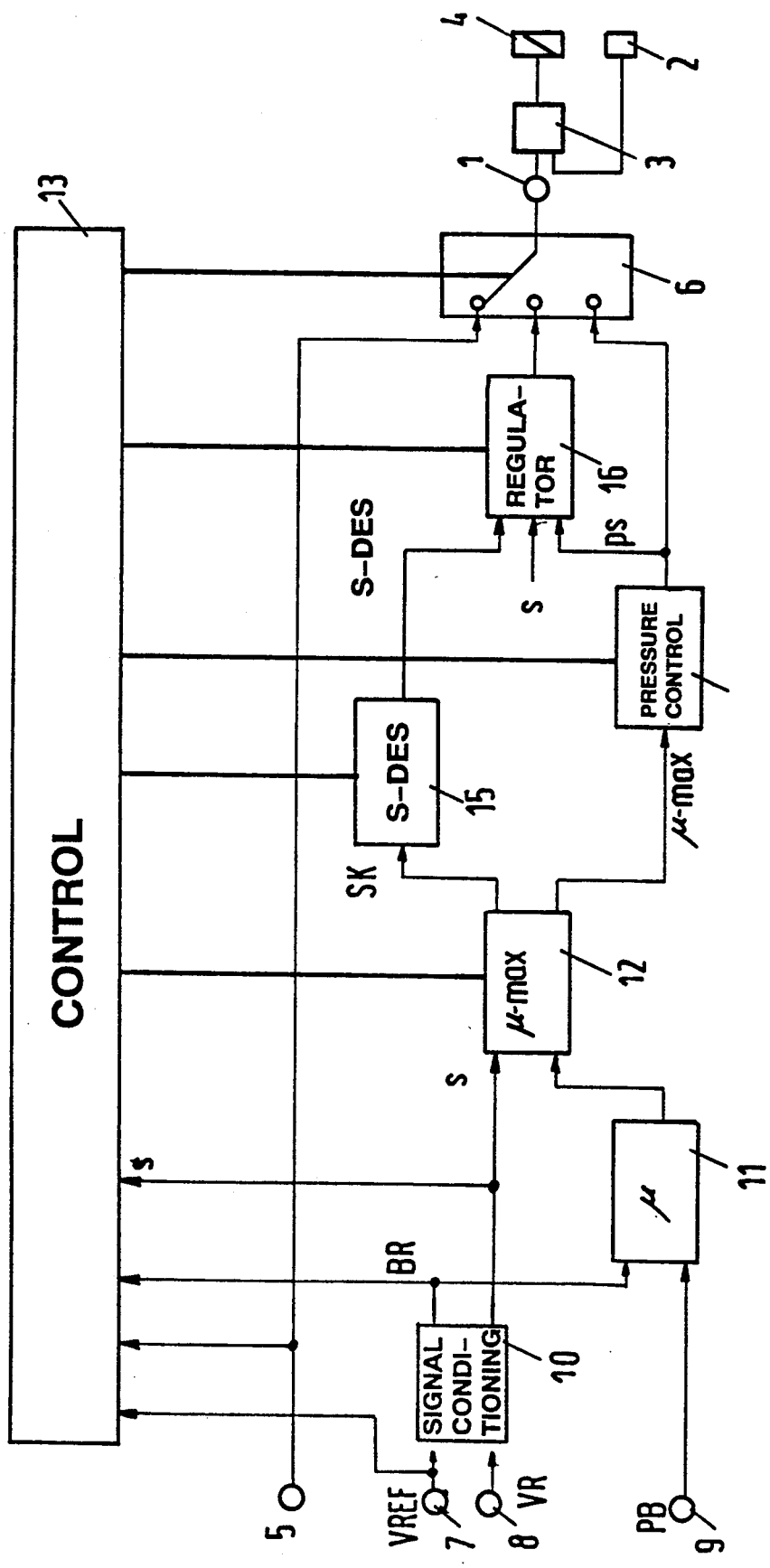
FIG. 1 is a block circuitry diagram of anti-blocking brake system according to the invention.

In FIG. 1, it is assumed that a control signal is produced at the terminal 1, the magnitude of the control signal being intended to specify a certain setpoint pressure at the brake. This value is compared in a comparator 3 to the wheel brake pressure measured by a sensor 2. Via a valve 4, pressure is introduced at the brake until the setpoint brake pressure is effective.

Figure 2:
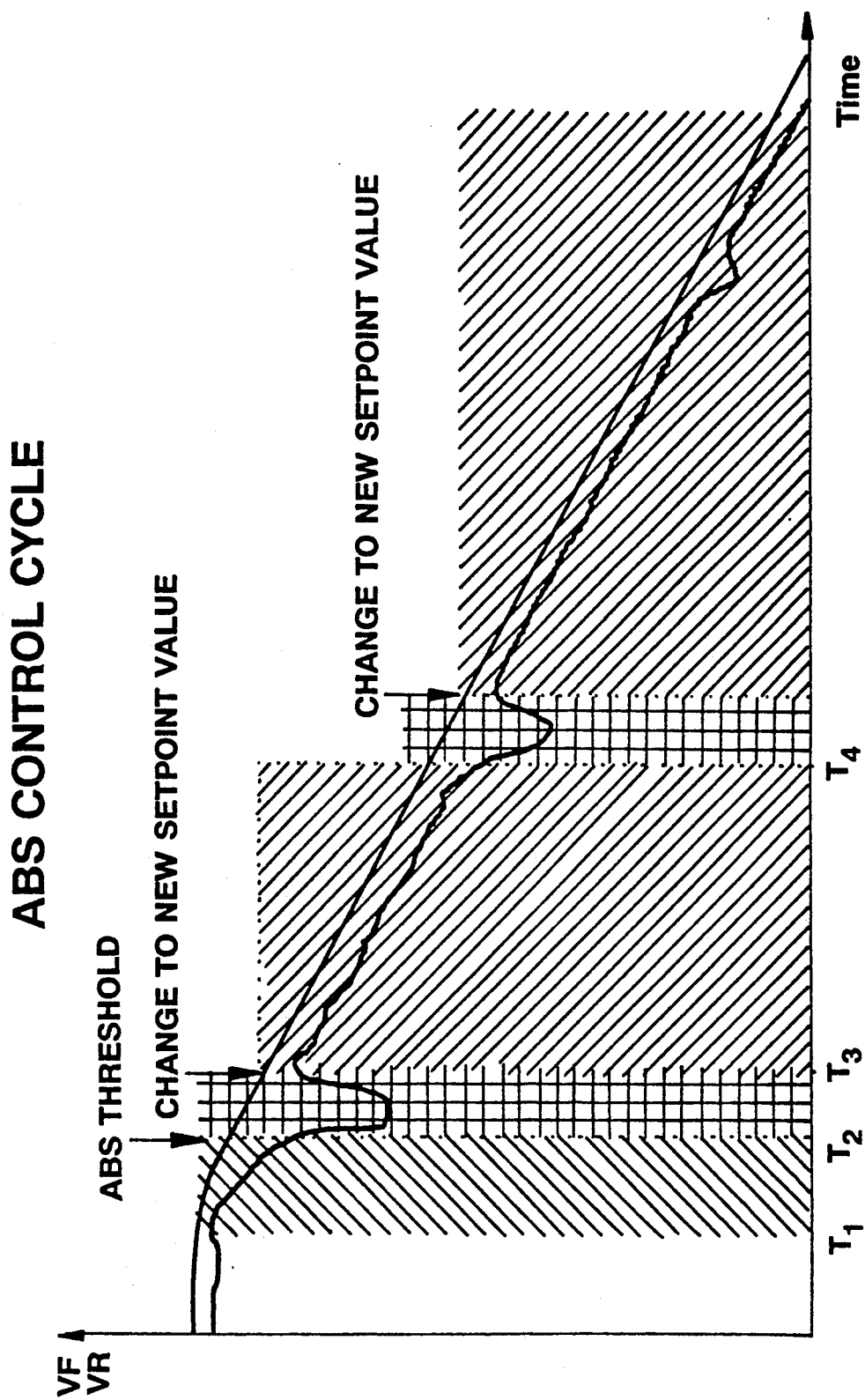
FIG. 2 is a graph showing a control cycle of an anti-locking brake control system according to the invention.

In the initial braking phase ($t_1$ to $t_2$ in FIG. 2), a setpoint pressure signal generated by the driver is applied (via terminal 5 and the switching device 6) to the input of the comparator 3. In parallel therewith, the wheel speed VR is measured and the reference speed $V_{Ref}$ is formed in a known manner.

These variables are applied to terminals 7 and 8. The signal of the pressure sensor 2 is fed in at a further terminal 9. In a signal conditioning unit 10, the slip signal (from $V_{Ref}$ and $V_R$) and the wheel deceleration BR (VR=BR) are determined. With the aid of the variables BR and PB, a block 11 continuously determines the friction coefficient $\mu$ utilised. A block 12 records the maximum $\mu$ value $\mu$max occurring during the initial braking phase and also the slip value $S_K$ present at this moment.

If the control detects a rise to a high slip SB or a large wheel deceleration, the switching device 6 is, on the one hand, connected to a pressure control 14 (pressure control phase) which, for its part assumes the value for $\mu$max and from this generates signals corresponding to the pressures Pmin and $P_s$. In the brake pressure control phase ($t_2$ to $t_3$ in FIG. 2), Pmin is initially set at the brake. If the slip value SB is undershot again, PS is brought into effect. As already stated, block 12 has recorded SK. In a block 15, this is used to form a slip setpoint value SSoll, which is fed to a regulator 16 as a setpoint value. If the slip S undershoots the value SK, this is reported to the control 13 by block 12 and the control then connects the switching device 6 to the regulator 16, activates the regulator 16 and initialises block 12. The regulator 16 adjusts the wheel slip S to the setpoint value $S_{Soll}$ ($t_3$ to $t_4$ in FIG. 2) until a new disturbance causes a switchover to brake pressure control again ($t_4$). Before the beginning of regulation, the integrator, of the regulator 16 is set to the value PS. The regulator 16 also receives the instantaneous wheel slip S as an input variable.

Figure 3:
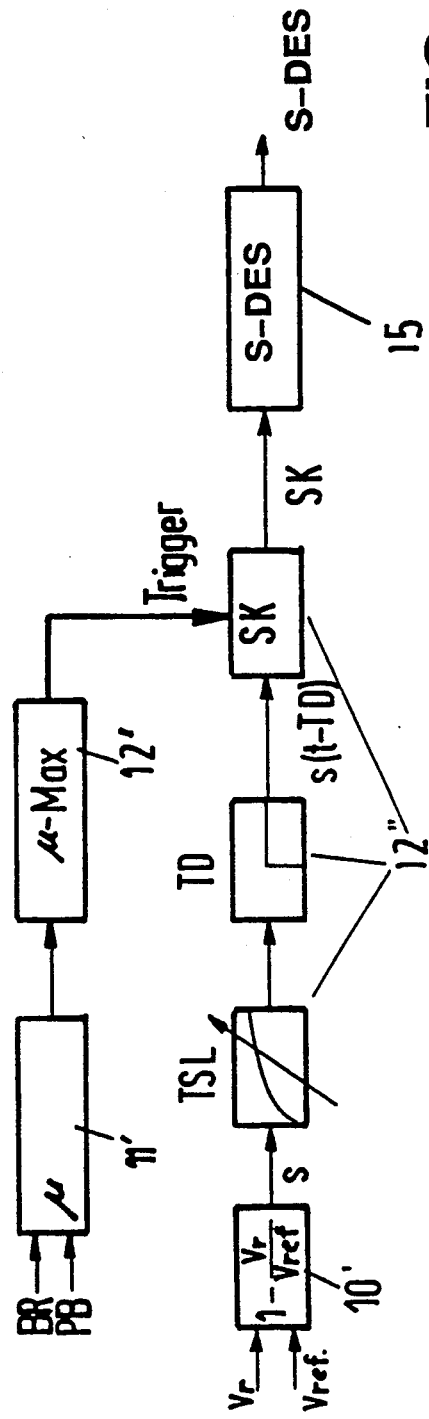
FIG. 3 is a block circuit diagram showing a more detailed circuit of the block 12 of FIG. 1.

Along with blocks 10', 11' and 15', FIG. 3 shows block 12 of FIG. 1 in somewhat greater detail (blocks 12, and 12"). 12' now contains only the $\mu$max detection, while, within 12", a filter TSL, an element for the time shift by TD and a trigger, the latter recording the value SK when $\mu$max occurs.

The abovementioned switchover of the parameters KP and TI is performed automatically by the regulator 16.

The control 13 contains a timing element which, in the case of control, measures the time period in which S is greater than SB. If this period is longer than a predetermined time, the control 13 acts on the regulator and causes the brake pressure to be lowered. Internally, the setpoint value former 15 can contain a part which, starting from the setpoint slip value determined, increases the latter continually, e.g. in steps, in the regulating phase.

We claim:

1. Anti-lock brake system for a vehicle wheel, comprising: means for determining a wheel speed VR and a brake pressure PB at a wheel brake of a vehicle wheel; means, responsive to the wheel speed VR and a reference speed VRef, for forming slip actual values S and wheel deceleration values BR; a slip regulator means for using the slip actual values S to regulate the brake pressure PB at the wheel brake; control means for causing regulating phases and brake pressure control phases to alternate; means for continuously determining a friction coefficient $\mu$ from the brake pressure PB and the wheel deceleration values BR; means for determining during each regulating phase a maximum value $\mu$max of the friction coefficient and the slip value SK when the maximum value of the friction coefficient is reached; means for using the slip value SK during each regulating phase to form a somewhat smaller slip setpoint value Sdes. which is specified as the slip setpoint value for the slip regulator means in the following regulating phase; and said control means is responsive to the wheel slip S rising during the regulating phases above a predetermined value SB, for switching the system over to a brake pressure control phase, during which said control means controls a pressure control means to initially introduce a reduced brake pressure Pmin and then to introduce an increased brake pressure PS relative to Pmin after the slip S has fallen below the below SB, and for subsequently brining the slip regulator into effect with the new setpoint slip Sdes. when the slip S becomes smaller than SK.

2. Anti-lock brake system according to claim 1, wherein said means for forming the actual slip is a filter acting as an average former.

3. Anti-lock brake system according to claim 1, wherein said means for determining the friction coefficient $\mu$ determines $\mu$ in accordance with the relation $$\mu = \frac{\Theta_R}{FZ \cdot r^2} \cdot BR + \frac{CP}{FZ \cdot r} \cdot PB$$

where
$\Theta_R$ is the moment of inertia of the wheel,
FZ is the wheel load,
r is the tire radius,
BR is the wheel deceleration,
CP is a proportionality factor, and PB is the brake pressure.

4. Anti-lock brake system according to claim 1, wherein said control means ends an initial braking phase and switches the system over to brake pressure control when at least one of a predetermined slip value and a predetermined wheel deceleration value is reached; and wherein said means for determining $\mu$max and SK determines same also in the initial braking phase.

5. Anti-lock brake system according to claim 2, wherein the means for determining the slip value SK determines same from the filtered actual slip with a timeshift by a dead time TD.

6. Anti-lock brake system according to claim 1, wherein said pressure control means, during the phase of brake pressure control, determines the brake pressure Pmin in accordance with the realtion $$Pmin = PS \cdot (\mu max + K)$$

and PS is determined in accordance with the relation $$PS = \frac{r \cdot FZ}{CP} \mu max \cdot PF$$

where
 K is a constant,
 FZ is the wheel load,
 PF is a safety faction ($<1$),
 CP is the mean slope of the hysteresis between brake pressure and braking torque, and
 r is the tire radius.

7. Anti-lock brake system according to claim 1, wherein said control means introduces pressure reduction if the slip is greater than SB for longer than a predetermined time.

8. Anti-lock brake system according to claim 1, wherein the slip regulator means has parameters gain KP and rest time TI; and said control means sets at least one of these parameters of these slip regulator to different values in the case of pressure build-up and pressure reduction.

9. Anti-lock brake system according to claim 1, wherein the setpoint slip value is continually increased as regulation progresses.

10. A method of controlling an anti-lock brake system for a vehicle wheel comprising: determining a wheel speed VR and a brake pressure PB at a wheel brake of a vehicle wheel; forming slip actual values S and wheel deceleration values BR from the wheel speed VR and a reference speed VRef; using the slip actual values S to control a slip regulator to regulate the brake pressure PB at the wheel brake; causing regulating phases and brake pressure control phases to alternate by:
 during the regulating phases, continuously determining a friction coefficient $\mu$ from the brake pressure PB and the wheel deceleration values BR; determining during each regulating phase a maximum value $\mu$max of the friction coefficient and the slip value SK when the maximum value of the friction coefficient is reached; using the slip value SK during each regulating phase to form a somewhat smaller slip setpoint value Sdes. which is specified as a slip setpoint value for a slip regulator in the following regulating phase; if the wheel slip S rises during the regulating phases above a predetermined value SB, switching the system over to brake pressure control, during which a reduced brake pressure Pmin initially is introduced and then an increased brake pressure PS relative to Pmin in introduced after the slip S has fallen below the value SB; and, subsequently bringing the slip regulator into effect with the new setpoint slip Sdes. when the slip S becomes smaller than SK.

11. A method according to claim 10, wherein said step of forming the actual slip includes filtering the wheel speed and the reference to form an average.

12. A method according to claim 10, wherein said step of determining the friction coefficient $\mu$ determines $\mu$ in accordance with the relation $$\mu = \frac{\Theta_R}{FZ \cdot r^2} \cdot BR + \frac{CP}{FZ \cdot r} \cdot PB$$

where
 $\Theta_R$ is the moment of inertia of the wheel,
 FZ is the wheel load,
 r is the tire radius,
 BR is the wheel deceleration;
 CP is a proportionality factor, and
 PB is the brake pressure.

13. A method according to claim 10, further including ending an initial braking phase and switching the system over to brake pressure control when at least one of a predetermined slip value and a predetermined wheel deceleration value is reached; and also determining $\mu$max and SK in the initial braking phase.

14. A method according to claim 11, wherein the step of determining the slip value SK determining the slip value SK from the filtered actual slip with a timeshift by a dead time TD.

15. A method according to claim 10, further comprising, during the brake pressure control phase, determining the brake pressure Pmin in accordance with the realtion $$Pmin = PS \cdot (\mu max + K)$$

and PS is determined in accordance with the relation $$PS = \frac{r \cdot FZ}{CP} \mu max \cdot PF$$

where
 K is a constant,
 FZ is the wheel load,
 PF is a safety faction ($<1$),
 CP is the mean slope of the hysteresis between brake pressure and braking torque, and
 r is the tire radius.

16. A method according to claim 10, further comprising introducing a pressure reduction if the slip is greater than SB for longer than a predetermined time.

17. A method according to claim 10, further comprising setting at least one of parameters gain KP and reset time TI of the slip regulator to different values in the case of pressure build-up and pressure reduction.

18. A method according to claim 10, wherein the setpoint slip value is continually increased as regulation progresses.

* * * * *